United States Patent
Read

(10) Patent No.: US 8,050,397 B1
(45) Date of Patent: Nov. 1, 2011

(54) MULTI-TONE SIGNAL DISCRIMINATOR

(75) Inventor: Brooks Stevens Read, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 1348 days.

(21) Appl. No.: 11/615,666

(22) Filed: Dec. 22, 2006

(51) Int. Cl.
- H04M 7/00 (2006.01)
- H04M 9/00 (2006.01)
- H04M 5/20 (2006.01)
- H04M 1/50 (2006.01)
- H04B 17/00 (2006.01)
- G06F 17/10 (2006.01)

(52) U.S. Cl. .......... 379/390.02; 379/283; 379/386; 455/67.13; 708/311

(58) Field of Classification Search .......... 324/76.57; 341/50; 370/210, 526; 371/6; 379/283, 379/351, 390.02, 386, 387.02, 406.13; 455/313, 455/350; 704/225–229; 708/312
See application file for complete search history.

(56) References Cited

U.S. PATENT DOCUMENTS

| | | | | |
|---|---|---|---|---|
| 5,553,081 A * | 9/1996 | Downey et al. | | 714/709 |
| 6,574,334 B1 * | 6/2003 | Bartkowiak | | 379/386 |
| 6,591,234 B1 * | 7/2003 | Chandran et al. | | 704/225 |
| 6,671,252 B1 * | 12/2003 | Cannon et al. | | 370/210 |
| 6,674,855 B1 * | 1/2004 | Karelic et al. | | 379/386 |
| 2001/0007442 A1 * | 7/2001 | Gerlach | | 341/50 |
| 2002/0058490 A1 * | 5/2002 | Sorrells et al. | | 455/313 |
| 2002/0076034 A1 * | 6/2002 | Prabhu et al. | | 379/390.02 |
| 2002/0080954 A1 * | 6/2002 | Felder et al. | | 379/386 |
| 2004/0174984 A1 * | 9/2004 | Jabri et al. | | 379/386 |

\* cited by examiner

Primary Examiner — Fan Tsang
Assistant Examiner — Jeffrey Lytle
(74) Attorney, Agent, or Firm — Schwegman, Lundberg & Woessner, P.A.

(57) ABSTRACT

In one embodiment, a method for discriminating between a machine generated multi-tone signal and a simulated voice multi-tone signal is provided. The method may comprise comparing output profiles generated from sampled outputs of a plurality of filters. The plurality of filters may have a single input sample stream applied to them and each filter may be preset at a measured multi-tone frequency associated with an identified prospective multi-tone signal. Based on the comparison of the output profiles, an inequality degree between the output profiles is generated and compared to an inequality threshold, thereby to determine whether the input sample stream comprises a machine generated multi-tone signal.

30 Claims, 5 Drawing Sheets

MULTI-TONE SIGNAL DISCRIMINATOR

FIELD

The present disclosure relates generally to a multi-tone signal discriminator, and in one example embodiment the disclosure relates to a dual-tone multi-frequency signal discriminator.

BACKGROUND

Various signaling techniques or protocols have been used over the years to convey information over a network, such as a telephone communication network. For example, dual-tone multi-frequency (DTMF) signaling was developed (and is still used in various telephone communications networks today) as a signaling or communication method in telephone central offices, various branch exchanges and various other applications where signaling occurs over a line in a voice-frequency band.

Phone calls may be generated with cellular or mobile telephones in mobile communication networks. These telephones may use voice compression to generate a digital signal from an analog voice signal, e.g., by using common encoding techniques such as Code Excited Linear Prediction (CELP). CELP coding encodes a voice signal as a time-variable filter excited by a pulse stream at the so-called "pitch frequency" of a speaker. A consequence of this is that a voice signal that has a constant pitch frequency and relative low modulation for a duration similar to a DTMF digit duration (e.g., 45 ms) may have a line spectrum instead of a fairly broadband signal, for example in circumstances where the voice signal is not modulated. Tone lines of the generated line spectrum may be of uniform frequency spacing and may further correspond to a pair of frequencies of a DTMF tone pair, resulting in this voice signal mimicking machine generated DTMF signals. These circumstances necessitate discrimination between machine generated DTMF signals and voice simulated DTMF signals produced by encoding techniques.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Overview

A method for discriminating between a machine generated multi-tone signal and a simulated voice multi-tone signal is provided. In one example embodiment the method comprises comparing output profiles generated from sampled outputs of a plurality of filters, the plurality of filters having a single input sample stream applied to them and each filter being preset at a measured multi-tone frequency associated with an identified prospective multi-tone signal. The method may further comprise generating an inequality degree between the output profiles, based on the comparison of the output profiles, and comparing the inequality degree with an inequality threshold to determine whether the input sample stream likely comprises a machine generated multi-tone signal.

Example Embodiments

Figure 1:
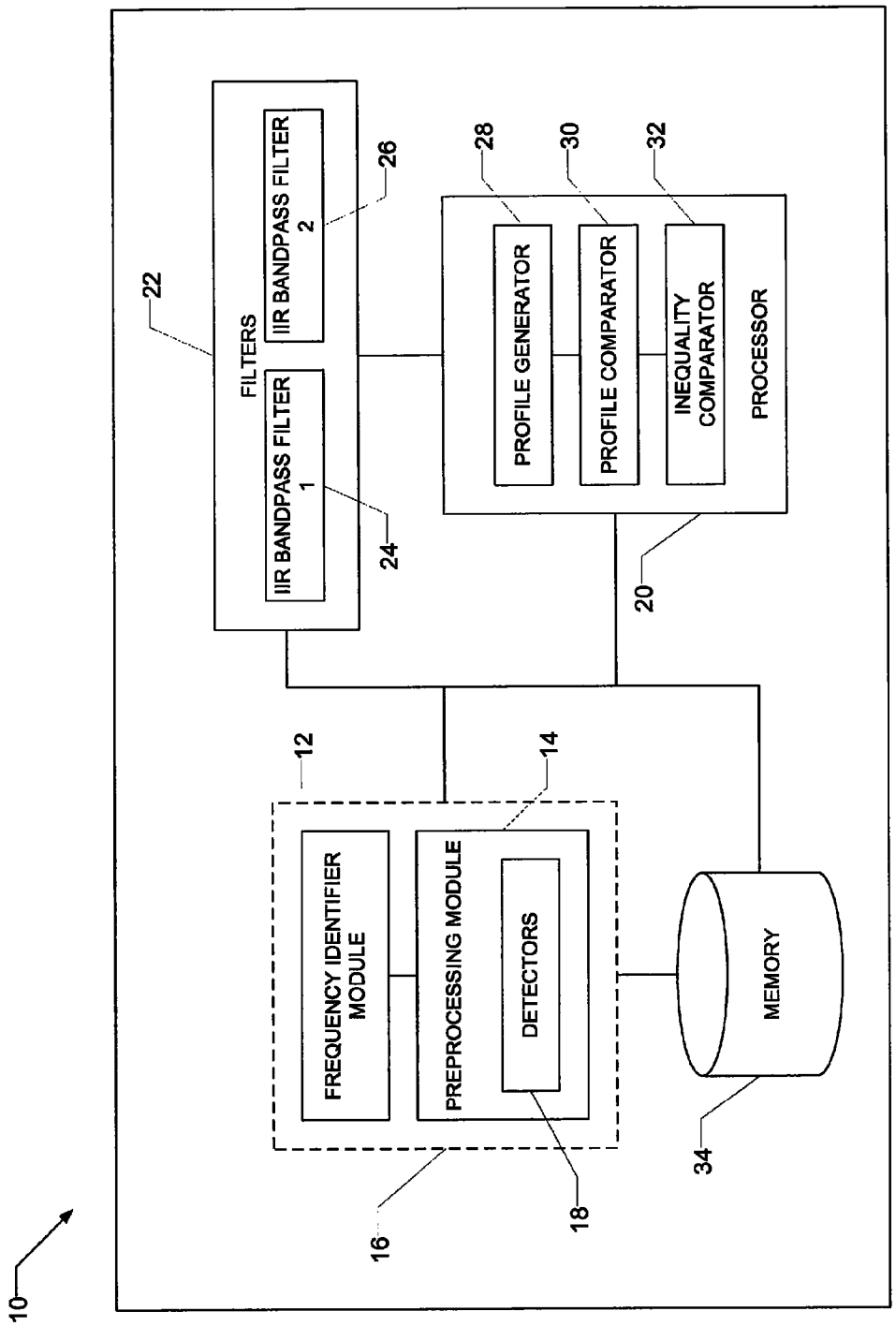
FIG. 1 shows an example of an apparatus in the form of a dual-tone signal discriminator, in accordance with an example embodiment.

Referring to FIG. 1, reference numeral 10 generally indicates an apparatus, in accordance with an example embodiment, to determine whether an input sample stream comprises machine generated multi-tone components, thereby to discriminate between a machine generated multi-tone signal and other signals, for example a voice simulated multi-tone signal produced by encoding techniques.

In example embodiments described herein the apparatus 10 may relate to a dual-tone multi-frequency (DTMF) signal discriminator. However, it will be appreciated that the apparatus may be used and may be adapted to discriminate between various multi-tone signals, each tone having a different frequency (e.g., multi-frequency components).

As mentioned, DTMF signaling was developed to allow dialing signals to dial numbers (e.g., telephone numbers) over wire links and non-wire links using the voice-frequency band, thereby establishing a form of in-band signaling. A typical DTMF keypad used for dialing numbers comprises a 4×4 matrix, with each row of the matrix representing a low frequency (e.g., 697 Hz, 770 Hz, 852 Hz and 941 Hz), while each column of the matrix represents a high frequency (e.g. 1209 Hz, 1336 Hz, 1477 Hz and 1633 Hz). When pressing a single key, e.g., "2", a pair of sinusoidal tones at the frequencies 697 Hz and 1336 Hz are generated. An example of an equation for the sampled version of this tone pair is the following:

$$X[i] = A^* \sin(i^* 2pi^* f1/fs) + B^* \sin(i^* 2pi^* f2/fs);$$

wherein,
f1 and f2 are the tone frequencies, and fs is the signal sampling rate; and
wherein A and B are the respective amplitudes of the two tones forming the multi- or dual-tone signal.

These tones are decoded at a receiving station, e.g., a switching station, thereby to determine which key was pressed.

As mentioned, when telephones use voice compression to generate a digital signal from an analog voice signal, e.g., by using common encoding techniques such as Code Excited Linear Prediction (CELP), the encoding may produce a voice signal which takes the form of a line spectrum instead of a fairly broadband signal. In circumstances where these tone lines of the generated line spectrum correspond to a pair of frequencies of a DTMF tone pair, it is necessary to discriminate between the machine generated DTMF signals and the voice simulated DTMF signals.

Real DTMF signals or machine generated DTMF signals have very precise frequencies and amplitudes, while voice simulated DTMF signals may have small variations in amplitude and frequency. The apparatus and method as described herein in accordance with example embodiments aim to detect the small variations, thereby to discriminate between the two types of signals.

Apparatus 10 may include a frequency identifier module 12 and preprocessing module 14 which are modules utilized for preprocessing a sample input stream. Frequency identifier module 12 and preprocessing module 14 are collectively designated by reference numeral 16, and although shown to be part of the apparatus 10 in this example embodiment, it will be appreciated that these modules 16 may form part of a separate apparatus that is communicatively coupled to apparatus 10.

The input sample stream may comprise a sampled voice signal in a communications network. However, as mentioned, the input sample stream may alternatively be any type of multi-tone signal, with each tone having a different frequency.

In an example embodiment, the frequency identifier module 12 may access the input sample stream of a voice signal in a communications network. The frequency identifier module 12 may process the input sample stream to identify respective multi-tone (e.g. dual tone) frequencies of a prospective multi-tone signal, such as a DTMF signal. For example, in the event that a key representing "2" is pressed on a DTMF keypad, the frequency identifier module 12 may identify a prospective dual-tone signal pair with two tones having respective identified frequencies of 697 Hz and 1336 Hz.

In one example embodiment, the frequency identifier module 12 may comprise a processor to compute or perform a Fast Fourier Transform (FFT) on the input sample stream, thereby to determine the respective multi-tone frequencies of a prospective multi-tone signal. Although a processor performing an FFT may be used, this may provide a low precision operation as the FFT only provides approximate tone frequencies for the prospective multi-tone signal, while high accuracy in the estimation of the tone frequencies may be required for optimal performance.

In another example embodiment, the frequency identifier module 12 may therefore be a set of bandpass filters tuned to prospective tone frequencies of the multi-tone signal. For example, where a DTMF keypad is used in a signaling system the set of bandpass filters may include four high frequency bandpass filters set, for example, at 1209 Hz, 1336 Hz, 1477 Hz and 1633 Hz. The DTMF keypad may further include four low frequency bandpass filters set, for example, at 697 Hz, 770 Hz, 852 Hz and 941 Hz.

The process of accurately determining the frequencies of a prospective multi-tone signal is described in more detail below.

The preprocessing module 14 may comprise various preprocessing detectors 18 which compare characteristics of a prospective multi-tone signal to preliminary thresholds. The characteristics may relate to frequency deviation tolerances, level tolerances and twist tolerances. For example, the detectors 18 may comprise a frequency deviation tolerance detector, a level tolerance detector and a twist tolerance detector.

Different countries have different specifications to specify the tolerable power levels of, for example, the DTMF signal levels. For example, in the United States of America DTMF tones should have an accuracy of approximately 2%. This relates to a 1633 Hz tone with a ±32 Hz variation. The predefined preliminary thresholds for the frequency deviation tolerance, level tolerance and twist tolerance may therefore be dependent on specifications of a particular country.

The level tolerance relates to absolute levels of a prospective multi-tone signal, while the twist tolerance relates to the relative level of the tones forming the multi-tone signal.

As each machine generated DTMF signal has to comply with these particular DTMF requirements, stipulated by protocols of different countries, the preprocessing module 14 and the preprocessing detectors 18 may provide a preliminary elimination of prospective multi-tone signals which do not meet the specified requirements embodied by the preliminary thresholds. In the event that a multi-tone signal does not meet the specified basic DTMF requirements, the preprocessing module 14 may reject the prospective multi-tone signal.

Once the prospective multi-tone signal has been identified by firstly determining the multi-tone frequencies of a prospective multi-tone signal and secondly by preprocessing the signal to ensure that the signal complies with the basic preliminary thresholds, the identified frequencies may be communicated to a processor 20 which may preset or tune a plurality of filters 22 to the respective frequencies. In an example embodiment, the plurality of filters may be two bandpass filters, such as infinite impulse response (IIR) bandpass filters 24 and 26. The IIR bandpass filters 24 and 26 should have an identical "Q" factor, which is described in more detail below.

The input sample stream may now be applied to each of the IIR bandpass filters 24 and 26 which is set at the measured multi-tone frequencies identified by the frequency identifier module 12.

The outputs of each of the bandpass filters 24 and 26 may be sampled at, for example intervals of 2.5 ms and then processed by a profile generator 28, profile comparator 30 and an inequality comparator 32 of the processor 20.

In an example embodiment, the profile generator 28 generates output profiles from the sampled outputs of the two IIR bandpass filters 24 and 26. The profile generator 28 may generate the output profiles, which may be output profiles of the RMS (root mean-squared) of the energy stored in each of the filters due to the applied input sample stream, by performing the Goertzel algorithm or Goertzel Feed Forward computation on a predetermined number of sampled outputs of the bandpass filters 24 and 26. In circumstances where the identified prospective multi-tone signal has a constant level or amplitude and a constant frequency at the determined IIR filter frequencies, the sequential IIR filter output RMS levels (and those of the Goertzel algorithm) are expected to increase at a similar rate, differing at most by a scaling constant.

The Goertzel algorithm is a numerically identical method of computing a single frequency in a Fourier transform, and may accordingly only be performed for the frequency of interest, e.g., the predetermined multi-tone frequencies. For example, numerous samples may be processed by one of the IIR bandpass filters 24 or 26, before these samples are applied to the Goertzel algorithm to determine the power level of that tone by computing how much energy had been stored in the filter. The square root of the Goertzel value is then taken to produce the RMS level of the tone. It will be understood that where the Goertzel algorithm is referred to, the square root of the Goertzel algorithm result will be taken to yield the RMS level of the tone.

When the Goertzel algorithm is applied to the outputs of the plurality of filters, the Goertzel algorithm provides output profiles or levels which increase asymptotically to a peak level. The proportional increase from one sample to the next may be very similar for both filters, in the event that the input sample stream comprises a machine generated DTMF signal. If the output levels of the Goertzel algorithm are plotted, a curve is produced which increases and asymptotically approaches the input tone level of the DTMF signal.

If the input to the IIR bandpass filter is substantially at the tuned centre frequency of the filter, the output level may be equal to the input level. If the input level in the filter is not at substantially the center of frequency, then the filter may attenuate the output level relative to the input level. However, when the filters are very closely tuned to the predetermined multi-tone frequencies, the Goertzel feed forward process may generate a level of the respective DTMF tone component. This process is described by way of example in more detail below.

The profile comparator 30 may compare the output profiles generated by the profile generator 28, e.g., the application of the Goertzel algorithm, and based on this comparison, may generate an inequality degree between the output profiles. In one example embodiment the profile comparator generates the inequality degree based on the comparison between the output profiles according to the Schwarz Inequality. The Schwarz Inequality states that for sampled signals x[i] and y[i]:

$$\text{sum}(x[i]^2) \times \text{sum}(y[i]^2) \geq (\text{sum}(x[i] \times y[i]))^2$$

Therefore, only when x[i]=k*y[i] may equality be achieved. The degree of inequality, relative to the computed terms above, is effectively a measure of the degree to which the profiles of the two IIR output sequences differ in basic shape, and not magnitude. This is described by way of example in more detail below.

As machine generated dual-tone signals may not vary in amplitude and frequency, while voice simulated dual tone signals do vary in amplitude and frequency, the inequality degree may be used to determine whether the input sample stream comprises machine generated dual-tone components.

The inequality comparator 32 compares the calculated inequality degree with a predetermined threshold of inequality. This inequality threshold may be very low, e.g., 0.0025 times sum (x[i]*y[i])^2, as the dual-tones of a machine generated DTMF signal should have very precise frequencies and amplitudes. By comparing the inequality degree to a threshold it is determined whether the two levels of the respective tones of the multi-tone signal are rising in very close synchrony. Although the actual levels of the tones forming the multi-tone signal may differ by a constant at any given instant, the change in level from one sample measurement to the next should track closely between the two filters.

The processor 20 may further detect whether a previously identified prospective multi-tone signal which was determined not to have a machine generated multi-tone signal is substantially the same as a consecutively identified prospective multi-tone signal. In the event that the same prospective multi-tone signal has been identified in consecutive samples, the processor 20 may increase the inequality threshold.

In an example embodiment, the apparatus 10 may also include a memory 34. The memory 34 may be used to store data, for example preliminary thresholds against which signal characteristics is to be checked, frequencies identified as multi-tone frequencies, as well as processed samples of the input signal. The memory may be physically separate from the apparatus and may take the form of SRAM, DRAM, FLASH RAM, magnetic storage, optical storage or any other type of memory, whether fixed or removable. A portion of the memory may be non-volatile to ensure that at least some of the contents of the memory remain intact when there is no power supply to the apparatus 10.

It will be appreciated that the memory 34 may be communicatively coupled (e.g., via appropriate interfaces) to the other modules and processors of the apparatus 10 so as to allow information and data to be passed between the different components modules or so as to allow the applications to share and access common data and functionalities.

Figure 2:
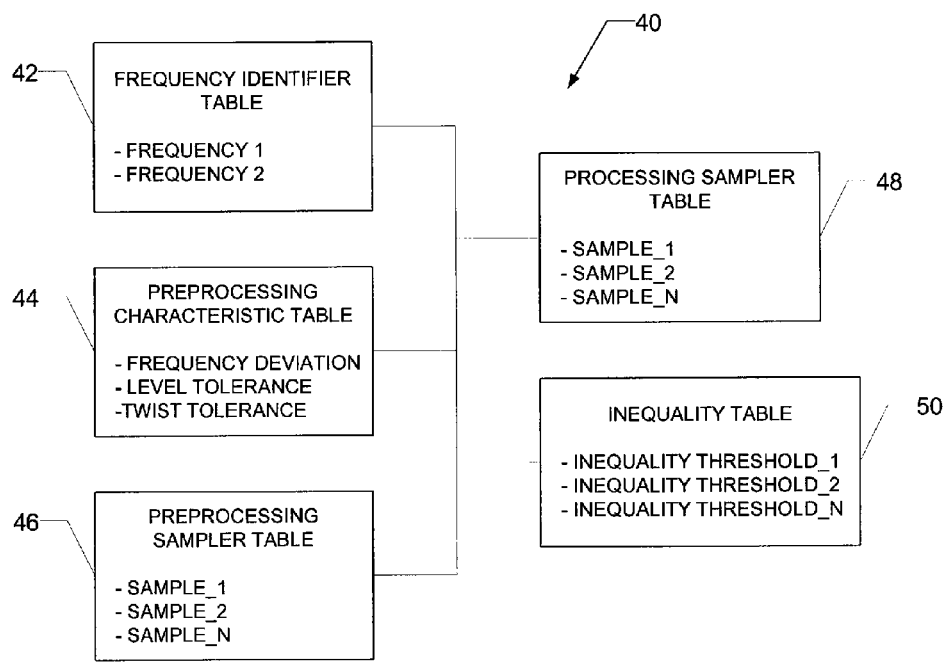
FIG. 2 shows a high-level entity-relationship diagram illustrating tables that may be maintained within a memory of an example apparatus, in accordance with an example embodiment.

FIG. 2 shows a high-level entity-relationship diagram illustrating tables 40 that may be maintained within a memory 34 of the example apparatus, in accordance with the example embodiment of FIG. 1.

A frequency identifier table 42 may contain frequencies identified as respective frequencies of prospective dual-tone signals. The frequency identifier module 12 may store these frequency values once the frequency identifier module 12 has identifier the frequencies. The processor 20 may access the frequency identifier table 42 to obtain the respective frequency values to tune the IIR bandpass filters 24 and 26.

A preprocessing characteristics table 44 may contain a frequency deviation threshold, a level tolerance threshold and a twist tolerance threshold. These thresholds are used by the detectors 18 of the preprocessing module to compare the prospective tone pair to the various thresholds, thereby to determine that the tone pair conforms to the basic DTMF characteristics.

A preprocessing sampler table 46 may store details of identified prospective multi-tone signals in order to allow the processor 20 to compare consecutively identified multi-tone signal and detect when these signals are the same.

A processing sampler table 48 may store outputs of the IIR bandpass filters 24 and 26 after the input sample stream has been applied to the IIR bandpass filters but prior to the profile generator 28 generating output profiles, as described above. The processing sampler table 48 may further store the generated output profiles (generated by the profile generator) prior to the comparing the output profiles to each other to obtain an inequality degree.

This enables the apparatus to increase the threshold for the Schwarz Inequality comparison over time if the apparent DTMF signal is persistent, e.g., when the same prospective multi-tone signals are consecutively identified. Therefore, the longer a particular multi-tone signal lasts, the more lenient the inequality degree may be.

For example, if a person uses a mobile telephone in an environment with high background noise, such as an airport, the background noise may influence the IIR bandpass output profile and cause an initial sample of a machine generated DTMF signal to be rejected. However, the longer the signal persists, the higher the inequality threshold may be and the apparatus 10 may therefore recognize the DTMF signal during this period when the inequality threshold has been raised.

The memory 34 may further comprise an inequality table 50 which may contain various inequality thresholds. These inequality thresholds may be used by the inequality comparator 32 to determine whether the inequality degree between the output profiles is below a predetermined threshold.

Figure 3:
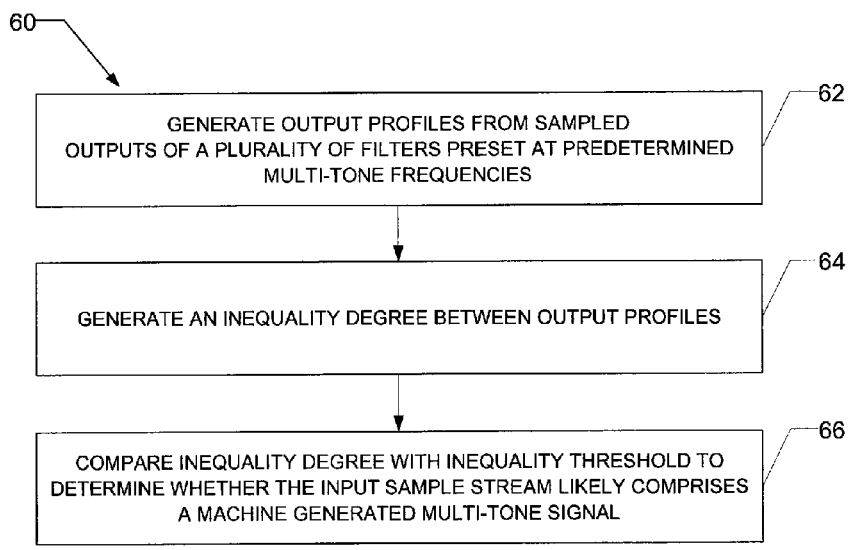
FIG. 3 shows an example of a method, in accordance with an example embodiment, for determining whether an input sample stream comprises machine generated dual-tone components.

FIG. 3 shows a flow diagram of a method 60, in accordance with an example embodiment, for determining whether an input sample stream comprises machine generated dual-tone components. In one example embodiment, the method may be implemented by the apparatus 10 of FIG. 1.

As shown by block 62, a profile comparator 30 compares output profiles which have been generated by a profile generator 28 from sampled outputs of a plurality of filters 22. As mentioned above, each filter (e.g., IIR bandpass filters 24 and 26) has been preset at a measured multi-tone frequency identified by a frequency identifier module 12 and an input sample stream has been applied to each of the filters 24 and 26 to the frequency identifier module 12 to identify these frequencies.

The profile comparator 30 may generate an inequality degree between the output profiles; based on the comparison of the output profiles (as shown by block 64) by applying the Schwarz Inequality.

In order to discriminate between machine generated dual-tone signals and voice simulated dual-tone signals thereby to determine that the input sample stream comprises a machine generated dual-tone signal, an inequality comparator 32 may compare the inequality degree generated by the profile comparator 30 with a predefined inequality threshold stored in the memory 34. In the event that the inequality degree is below the inequality threshold, the dual tone signal is determined to be machine generated and is passed on to other modules for further processing.

Figure 4:
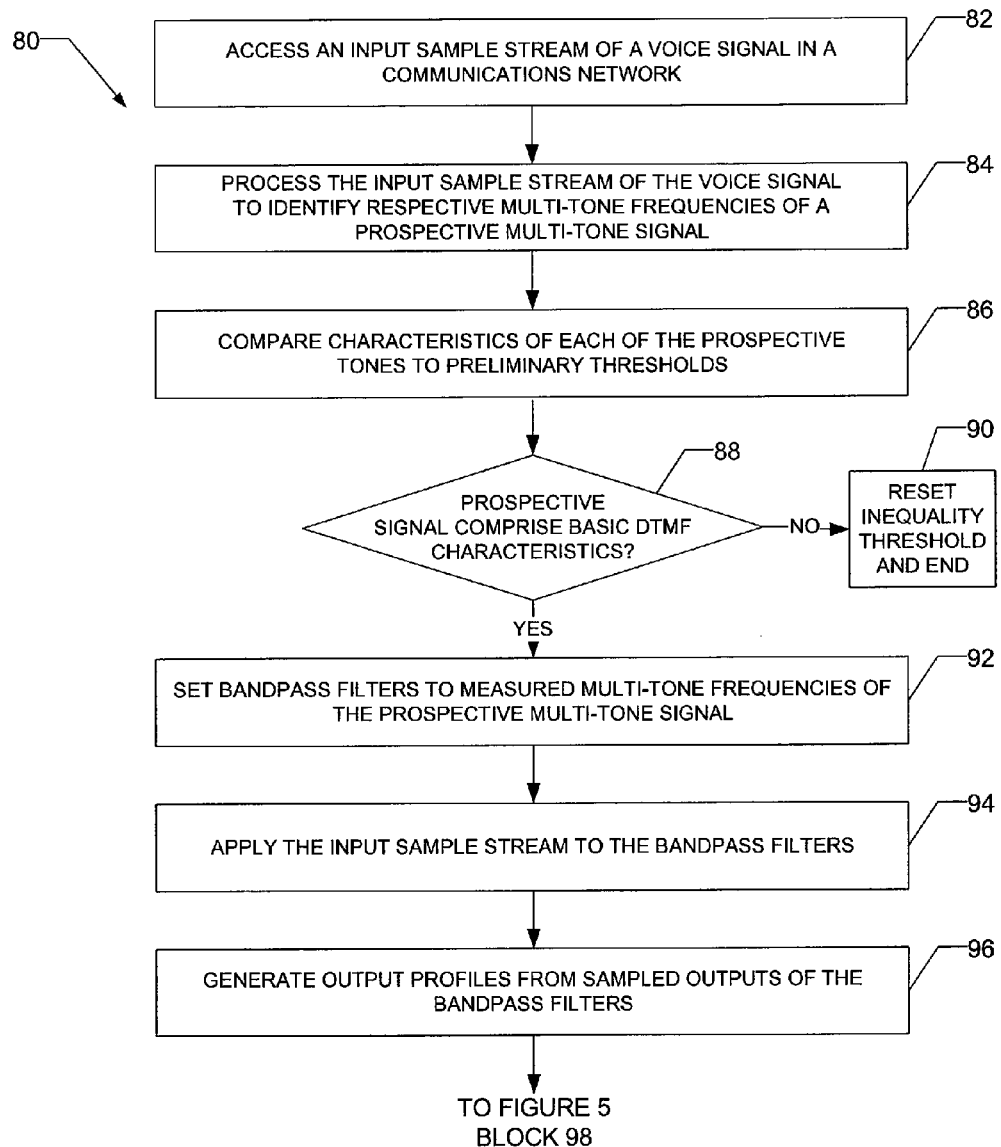
FIGS. 4 and 5 show a detailed schematic flow diagram the method of FIG. 3, in accordance with another example embodiment.
Figure 5:
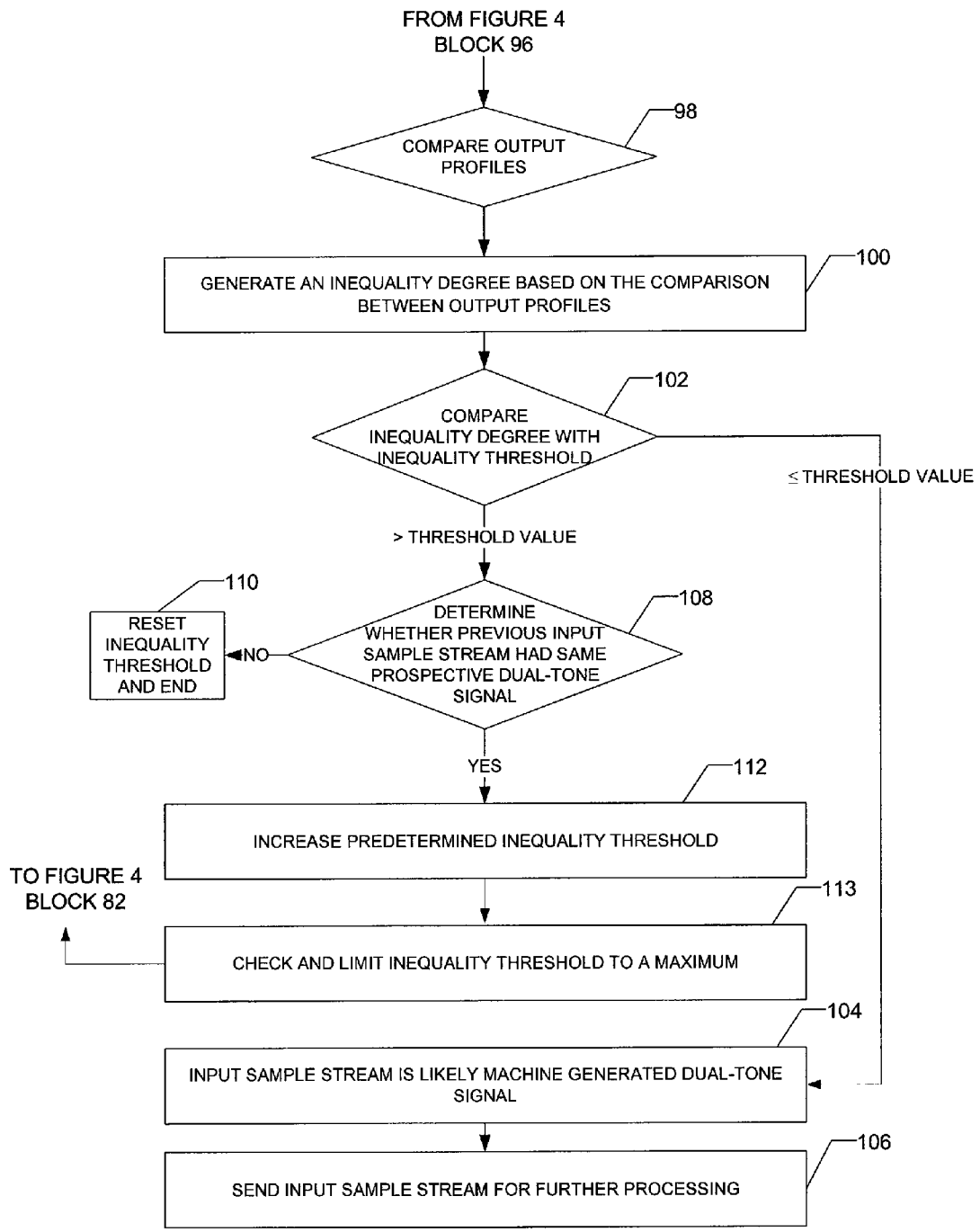

FIGS. 4 and 5 show a detailed schematic flow diagram of a method 80, in accordance with an example embodiment, for determining whether an input sample stream comprises machine generated dual-tone components. In one example embodiment, the method 80 may be implemented by apparatus 10 of FIG. 1.

As shown by block 82, the frequency identifier module 12 of apparatus 10 may access an input sample stream of a sampled voice signal in a communications network. The frequency identifier module 12 may process (shown by block 84) the input sample stream to identify respective multi-tone frequencies of a prospective multi-tone signal.

Detectors 18 of a preprocessing module 14 may compare characteristics of the dual-tone signal to preliminary thresholds relating to frequency variance tolerances, level tolerance and twist tolerance (block 86). As shown by block 88, if the comparison with the preliminary thresholds results in a conclusion that the multi-tone signal has the basic characteristics of a DTMF signal, the input sample stream will be processed further. Alternatively, if the multi-tone signal does not conform to the basic characteristics of a DTMF signal, the processing of the signal will abort (shown by block 90).

Each filter (e.g., IIR bandpass filters 24 and 26) of a plurality of filters 22 may respectively be preset by the processor 20 at the measured multi-tone frequencies identified by the frequency identifier module 12 (block 92). The input sample stream may now be applied to each of the filters 24 and 26, shown by block 94.

A profile generator 28 of the apparatus 10 may generate (block 96) output profiles from the outputs of the IIR bandpass filters 24 and 26.

Similar to FIG. 4, and as shown by blocks 98 and 100 (see FIG. 5), a profile comparator 30 compares the output profiles generated by the profile generator 28 and generates an inequality degree based on the comparison between the output profiles.

In order to discriminate between machine generated dual-tone signals and voice simulated dual-tone signals thereby to determine that the input sample stream comprises a machine generated dual-tone signal, an inequality comparator 32 may compare the inequality degree (block 102) generated by the profile comparator 30 with a predefined inequality threshold stored in memory 34. In the event that the inequality degree is equal to or below the predetermined inequality threshold, the identified prospective multi-tone signal is determined to be machine generated (shown by block 104) and is passed on to other modules for further processing (shown by block 106).

If the inequality degree of the output profiles is above the predefined inequality threshold, the processor 20 determines, by accessing the memory 34, whether the previous input sample stream processed had the same prospective multi-tone signal (shown by block 108). In the event that the same prospective dual-tone signal has been identified in consecutive input sample streams, the processor 20 increases the inequality threshold (block 112), stores the updated inequality threshold in the memory 34 and the method returns to block 82 (see FIG. 4), where subsequent input samples are processed as described above. Optionally, as shown at block 113, the inequality threshold may be limited to a maximum. Finally, if the previously detected prospective dual-tone signal is again found, the inequality degree determined from the output profiles is compared to the adjusted inequality threshold. If a different prospective dual-tone is found, or no dual-tone is found, then the inequality threshold is returned to its most initial value.

It will be appreciated that the apparatus 10 and methods of the above described example embodiments would be able to detect a multi-tone signal irrespective of whether the tones of the signal beat. Beating occurs when two tones of similar amplitude alternately interfere with one another, then reinforce each other, producing an envelope modulation. The rise and decay between maximum and minimum values will occur periodically at the difference frequency between the two tones. A consequence of beating between tones is that the rising level profile of the tones will not be uniform. However, as the apparatus and methods of the various example embodiments compare the rise of one tone against the rise of another, the rate of profile rise is modulated by the same effect in each tone, and the inequality degree is consequently unaffected.

The signal processing of a sample input stream is now described in accordance with an example embodiment, utilizing the example apparatus 10 of FIG. 1.

In circumstances where a multi-tone signal, such as a DTMF signal, is present in a signal, each individual signal sample of the signal will contain the arithmetic sum of the two DTMF tones. For example, in the case of DTMF digit "0" (941 Hz+1336 Hz), each 8 kHz sample may contain a signal (e.g., x[i]) in accordance with the following equation:

$$x[i] = A\_941 \times \sin\left(i \times 2\pi \times \frac{941}{8000}\right) + A\_1336 \times \sin\left(i \times 2\pi \times \frac{1336}{8000}\right)$$

In this equation A__941 is the amplitude of the 941 Hz tone and A__1336 is the amplitude of the 1336 Hz tone.

In practice, an individual signal sample does not contain enough information to infer that a DTMF signal is present. It is therefore necessary for a large number of consecutive samples to be processed by the frequency identifier module 12 (e.g. a processor running an FFT or a set of bandpass filters) to determine if DTMF tones are present. Generally, the more samples processed, the more certain one may be that DTMF tones are present.

In the event that the frequency identifier module 12 is a processor running an FFT, the FFT is applied to a block of consecutive signal samples. For example, in one example embodiment, the FFT may be applied to the most recently received 256 samples. Although the FFT spectrum may be computed once for each 256 received samples, it may be more advantageous to compute the FFT output spectrum once for each 160 samples of received samples.

Therefore, each time the FFT spectrum is computed, 96 samples (256−160=96) are samples which have already been used in the previous FFT computation, while 160 newly received samples are concatenated to those 96 "old" samples.

The FFT is then computed on the resulting block of 256 samples, providing overlap between the computed FFTs which may reduce the latency of detection.

The FFT result may be a set of "bins", each containing the energy that was present in a narrow range of frequencies of the input samples. In an example embodiment, the input samples arrive at 8 kHz, and therefore represent a signal containing frequencies from zero to 4 kHz (according to the well-known Nyquist theory). The input sample stream accordingly has a "4 kHz bandwidth" (the range of frequencies represented). With no imaginary input signal, the FFT generates an even-symmetry power spectrum. The negative frequency components can therefore be discarded, resulting in 128 frequency bins, each bin representing a slice of the 4 kHz bandwidth of the input samples.

It follows that each bin has a "width" of 4000 Hz/128 bins=31.25 Hz/bin. The value in the first bin represents the energy at zero Hz, +15.625 Hz, the second represents 31.25±15.625, and so on.

To determine whether the DTMF digit "0" (having frequency components at 941 Hz and 1336 Hz) is present, the FFT bin 941/31.25=30.1≈30, and bin 1336/31.25=42.7≈43 would be interrogated. If these two bins contained the preponderance of the total signal energy, it indicates that the DTMF digit "0" may have been present in the 256 samples that the FFT had operated on.

As described above, once the frequency identifier module 12 has determined the respective multi-tone frequencies of the prospective multi-tone signal, the preprocessing module 14 may determine whether the prospective multi-tone signal conforms to the basic multi-frequency characteristics.

Turning now to the plurality of filters 22, each IIR bandpass filter 24 and 26 may accept sequential samples of the received input sample stream, which may contain two frequencies of a DTMF digit mixed together in each sample. Each filter attenuates energy that is not at the filter "center frequency". For example, in the case of detecting DTMF digit "0" (with tones at 941 Hz and 1336 Hz) two IIR bandpass filters are required, one for each of the two DTMF frequencies. The samples from the input sample stream may be fed to both filters 24 and 26, with one of the filters attenuating non-941 Hz energy, and the other attenuating non-1336 Hz energy. Greater deviation from the center frequency results in greater attenuation, so each filter may substantially reject the other filter's tone energy.

As mentioned, the Goertzel algorithm or Goertzel feed-forward computation may be used to determine the output of the multi-tone signal at a particular frequency. For example, the Goertzel feed forward computation will determine the current estimate of the 941 Hz tone signal's energy, while substantially rejecting the 1336 Hz tone signal's energy. The same applies for the IIR filter set at 1336 Hz. The more samples processed by the IIR bandpass filters, the higher each respective bandpass filter's output level may rise if a DTMF tone signal is present at or near the bandpass center frequency. The output level may increase to a particular level as the respective filter is achieving increasing certainty as it processes more samples. In effect, it is accumulating the energy at the frequency to which it is tuned. Each filter may also be bleeding off energy, so that the output level does not rise indefinitely, but rather reaches an asymptote.

In an example embodiment, the IIR bandpass filters 24 and 26 process an input sample stream x[i], which is sampled at sample rate fs. The filters attenuate signals which differ from the center frequency fc, producing an output stream y[i]:

$$y[i] = (G \times x[i]) + (k_1 \times y[i-1]) + (k_2 \times y[i-2]) \rightarrow [1]$$

where G=input gain value (described in more detail below)

$$k_1 = 2 \times r \times \cos\left(2\pi \frac{f_c}{f_s}\right) \rightarrow [2]$$

$k_2 = -r \times r \rightarrow [3]$ r=Q control value; 0<r<1; as r→1, the filter bandwidth→0

The rate at which attenuation increases with a deviation from fc is controlled by the "Q control value" r (e.g., r=0.99 in an example embodiment).

One or more samples are processed according to equation [1], e.g. 20 samples may be processed. As mentioned, with each sample processed the estimate of the energy at fc tends to improve, and the attenuation of other frequencies tends to increase.

When it is desired to know the strength of the signal at or near fc, the Goertzel feed-forward computation may be used by the profile generator 28 to compute the output profile or tone power represented in the most recent IIR outputs y[i] and y[i−1]. IIR processing of the next block of consecutive input samples, followed by computation of the Goertzel equation, may for example be repeated a dozen times to yield a tone profile.

$$\text{GoertzelFeedForward Result} = y[i]^2 + (k_3 \times y[i] \times y[i-1]) + y[i-1]^2 \rightarrow [4]$$

where:

$$k_3 = -2 \times \cos\left(2\pi \frac{f_c}{f_s}\right) \rightarrow [5]$$

For the selection of "G" the following factors may be taken into account. When the computations of equation [1] are carried out using integer mathematics, it may be desirable to choose the input gain G to provide as high a gain as possible without risking integer value overflow. One method of accomplishing this is to choose G such that when input x[i] consists of a pure tone at the bandpass filter center frequency fc (and therefore has the maximum gain), the output y[i] will have the same amplitude as x[i]. Any other frequencies will be attenuated, causing the peak output y[i] samples to be equal to or less than the peak input samples x[i]. An approximation for the value of G that causes the y[i] to have the same magnitude as the x[i] when the input is a pure tone at fc (after sufficient samples have been processed to reach the asymptotic limit) is:

$d = 1 - r \rightarrow [6]$ $$G = (2 \times d - d \times d) \times \sin\left(2\pi \frac{f_c}{f_s}\right) \rightarrow [7]$$

In an example embodiment, the above equation for G may be reduced to G=(1−r^2)*sin(2*pi*fc/fs) and coded in this form.

The following is taken into account with regard to Goertzel feed forward result scaling. If the input signal x[i] is a pure tone of RMS amplitude A/sqrt(2) at the bandpass center frequency fc, and sufficient samples are processed to allow the y[i] to converge to near their asymptotic limit, then the Goertzel feed-forward computation (equation [4]) will yield a value which is proportional to the mean-square value of the x[i]. Consider the case of equation [4] when y[i−1] is zero:

$$GoertzelFeedForwardResult = y[i]^2 + (k_3 \times y[i] \times y[i-1]) + y[i-1]^2 \to [4]$$

$$= y[i]^2 + (k_3 \times y[i] \times 0) + 0^2$$

$$= y[i]^2$$

Since it is known that the signal y[i] is a sample of a sine wave at frequency fc, and the amplitude of y[i] is the same as x[i] (due to the choice of G), then:

$$y[i] = A \times \sin\left(2\pi \frac{f_c}{f_s}\right)$$

so when y[i−1]=0:

$$GoertzelFeedForwardResult = y[i]^2$$

$$= y[i]^2 + (k_3 \times y[i] \times 0) + 0^2$$

$$= \left(A\sin\left(2\pi \frac{f_c}{f_s}\right)\right)^2$$

and therefore the gain of the Goertzel feed-forward result is dependent on the frequency fc. It may be more desirable to have the Goertzel feed-forward result provide a value which is always equal to the mean-square level of input sequence x[i] (when x[i] is a pure tone at the bandpass center frequency fc). Hence, it is desirable to find a constant k4 such that:

toneMeanSquareLevel=$k_4$×GoertzelFeedForward Result so:

$$k_4 = \frac{toneMeanSquareLevel}{GoertzelFeedForwardResult}$$

$$= \frac{\left(\frac{A}{\sqrt{2}}\right)^2}{\left(A\sin\left(2\pi \frac{f_c}{f_s}\right)\right)^2}$$

$$= \left(\frac{1}{\sqrt{2}\sin\left(2\pi \frac{f_c}{f_s}\right)}\right)^2$$

To summarize, blocks of samples are processed according to:

$$y[i]=(G\times x[i])+(k_1\times y[i-1])+(k_2\times y[i-2]) \to [1]$$

Periodically the estimate of the mean-square level of the energy at or near fc is computed using:

toneMeanSquareLevel=$k_4$×GoertzelFeedForward Result

The toneMeanSquareLevel values should increase asymptotically toward the mean-square level of the tone as the bandpass filters refine their estimates of the tones' power.

Due to the squaring operations in the Schwarz Inequality computation, the root-mean-square tone values are used instead of the mean-square values, thereby limiting the dynamic range requirements of the Schwarz computation.

Beating of the component tones results in an uneven growth in the profiles, depending on the current beating state. However, the effect is the same for both tones, and so is effectively cancelled when comparing the profiles of the two tones. The cancellation of the beating effect allows the application of much tighter ramp profile limits, improving the ability to discriminate precise, machine generated tones from the typically slightly varying tones of voice emulating DTMF.

In an example embodiment when there is twist in the signal (twist is a level difference between the two tones of interest) then the beating effect may not be cancelled. Thus, the beating effect, which causes an uneven rise in the IIR filter output level, may only be the same in both tones if both tones have the same amplitude.

Tolerable twist may be country-specific, but may be up to about 6 dB (a factor of two level differences between the tones). In an example embodiment, to at least reduce the twist problem the IIR filter input block size (number of input samples processed between output values) may be chosen to be close to an integral number of beat periods. This may provide high quality cancelling of the uneven level increase effect, causing the Schwarz inequality to be much closer to equality. Consequently, tighter inequality thresholds can be used, improving the ability to discriminate machine and voice generated signals.

In an example embodiment, the following algorithm may be used for choosing the IIR filter input block size to be a near integral multiple of the beat interval.

When the sampling period is, for example, 8 kHz, the beat period for DTMF tones may range from minBeatPeriod=8000/(1633−697)=8.54 samples to maxBeatPeriod=8000/(1209−941)=29.85 samples. If a tolerance of about 2.5% for the DTMF tone frequencies is included, then the BeatPeriod is greater than or equal to 8, and less than or equal to 32. Approximately 30 ms, or 240 samples, of tone "history" may be available when the IIR filters are run (this value may be near the minimum DTMF duration for a valid digit). One IIR filter output may be generated for each beat period within the available samples. However, if the beat period is quite short (closer to 8 samples), then generating an IIR output on each beat period can result in a relatively large beat period error (up to 0.5/8 samples=1/16 beat period), thereby decreasing the immunity to beat effects. Using two beat intervals may halve the achievable beat interval error, but if the beat period is long (about 32 samples), then using two beat periods per IIR output may result in a very small number of IIR outputs to be subjected to the Schwarz inequality test, thus decreasing its discrimination effectiveness. In an example embodiment, a compromise may be used where an integral number of beat periods is used such that the number of IIR input samples per output is in the range 16-32 samples. This may be computed as follows:

nBeatPeriods=(2*8000)/(hiToneFreq−loToneFreq);
/*samples per two beat periods*/if (nBeatPeriods>32)
{
nBeatPeriods=nBeatPeriods/2;
}
The number of blocks of IIR input is then:
numberOfDtmfSamplesAvailable/nBeatPeriods;

An example method of measuring or estimating DTMF tone frequencies from the results of an FFT is described merely by way of example below. It will be appreciated by a person of skill in the art that various other techniques may be used and that the example embodiments described herein are not limited to this example technique.

In an example embodiment, the FFT may produce 128 bins of output values, with output bin "I" centered on a frequency of i*31.25 Hz. If for example, a peak bin (relative to adjacent bins) is found for example at bin 22 (which is centered on 22*31.25=687.5 Hz), this may indicate that there is, for example, a tone somewhere in the range 687.5+−15.625 Hz. However a more precise estimate of the tone frequency is advantageous. Accordingly, a computation may be performed involving FFT result bins adjacent to the peak bin. However, "leakage" may arise in which some of a tone's energy ends up in bins adjacent to the primary bin. If the FFT is directly computed using the raw received samples, there may be severe "leakage" of a tone's energy into many adjacent bins of the FFT result. Thus, in an example embodiment, to reduce (and ideally minimize) leakage, and therefore constrain the energy of a tone to a much more limited number of adjacent FFT result bins, a well-known technique of "windowing" the FFT input samples may be utilized. Accordingly, in an example embodiment, samples that will be processed by the FFT may be multiplied by a "window" comprising a set of weighting factors that are near zero at the extremities of an input sample set, and larger near the middle of the input sample set.

In an example embodiment, the well-known "Hamming window" may be used. When the Hamming window is used, the energy of a pure tone may be constrained to, or concentrated in, about 3-4 adjacent FFT result bins. If the FFT were a "continuous time" FFT (and thus not sampled, but instead with an effectively infinite sample rate), then the FFT result bins form a continuum (instead of a discrete set, at intervals of about 31.25 Hz). A pure tone may then always produce a characteristic "waveform" in the FFT results. The waveform would be a simple "hump" centered on the tone frequency. This waveform would be the same as the FFT of the window function in shape, but shifted so as to be centered on the tone frequency. However, the example embodiment described herein may use a discrete FFT, so instead of the continuous waveform of a continuous time FFT result, samples of that continuous time FFT result may be provided at intervals of 31.25 Hz.

Returning to the windowed input tone, the FFT of the input tone may be calculated resulting in, for example, about 3-4 adjacent FFT bins that may contain the majority of the tone energy. If the tone falls precisely at the midpoint between two bins, then the two adjacent bins will each have equal value, and bins further out will have smaller, symmetric values. Given the peak bin (which may be found through a peak searching process), the following mathematical operation may be performed on the peak bin and its two adjacent bins to estimate the tone frequency:

peakBinFrequencyInHz=peakBinIndex*31.25;

estimatedToneFreq=$k5$*log 2(*fft*Bin[peakBinIndex+
1])−log 2(fftBin[peakBinIndex−1]);

Where the "fftBin[ ]" values are the power in each bin (not the RMS level), and "log 2(x)" is a function which returns the base-2 logarithm of the argument "x".

The value of $k5$ may be derived through simulation and, in an example embodiment, may have a value of approximately 2.80.

Figure 6:
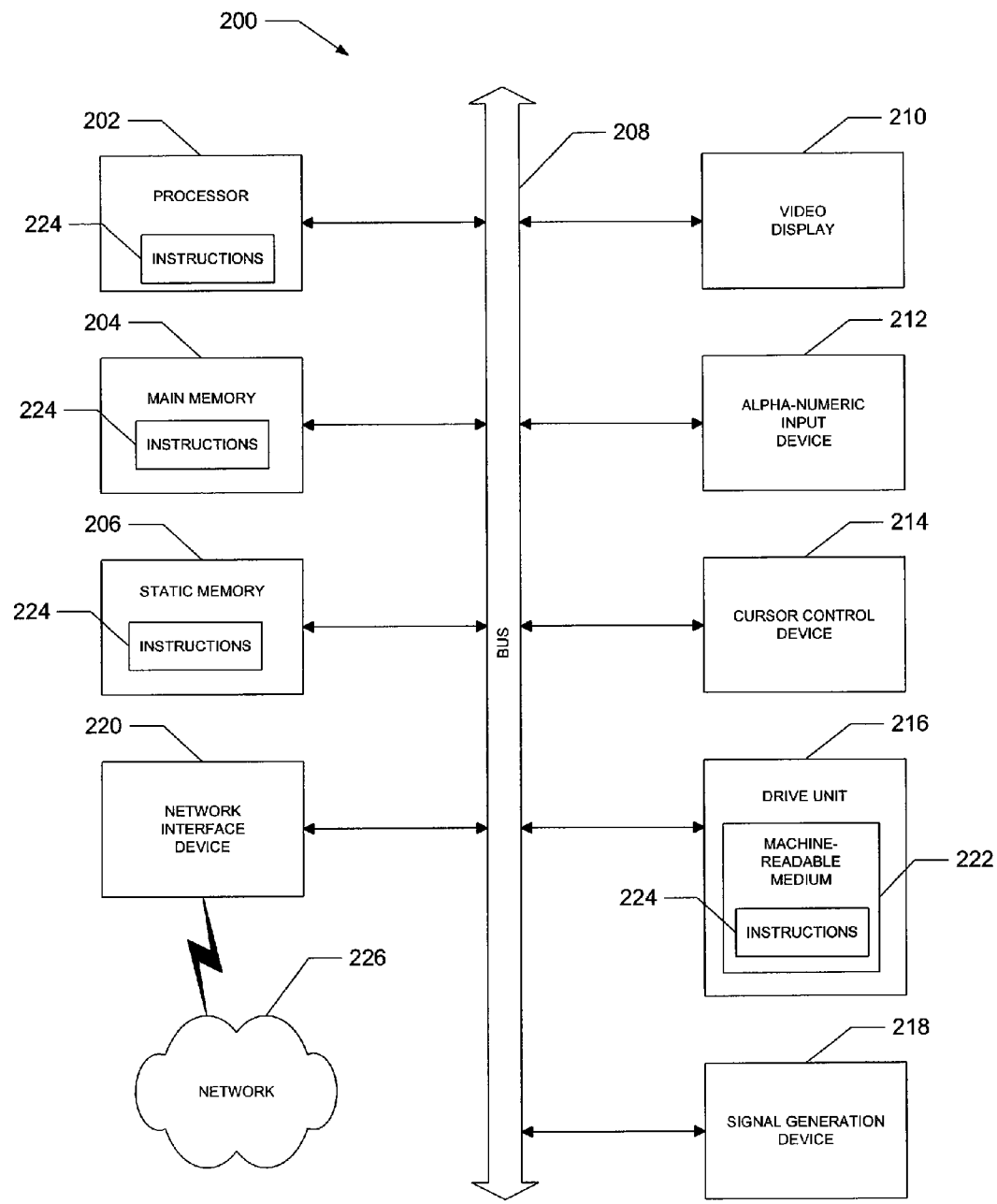
FIG. 6 shows a diagrammatic representation of a machine in the example form of a computer system within which a set of instructions, for causing the machine to perform any one or more of the methodologies discussed herein, may be executed.

FIG. 6 shows a diagrammatic representation of a machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   comparing output profiles generated from sampled outputs of a plurality of filters, the plurality of filters having a single input sample stream applied to them and each filter being preset at a measured multi-tone frequency associated with an identified prospective multi-tone signal;
   based on the comparison of the output profiles, generating an inequality degree between the output profiles;
   comparing the inequality degree with an inequality threshold to determine whether the input sample stream comprises a machine generated multi-tone signal; and
   determine that the input sample stream comprises a machine generated multi-tone signal when the inequality degree between the output profiles is lower than the inequality threshold.

2. The method of claim 1, wherein the multi-tone signal is a dual-tone multi-frequency signal.

3. The method of claim 2, wherein the plurality of filters is two infinite impulse response (IIR) bandpass filters.

4. The method of claim 1, which comprises generating the inequality degree between the output profiles according to the Schwarz inequality.

5. The method of claim 4, further comprising performing Goertzel algorithm functionality on a predetermined number of sampled outputs of the plurality of filters thereby to obtain the output profiles.

6. The method of claim 5, wherein each output profile is an output profile of the energy stored in each of the filters due to the applied input sample stream.

7. The method of claim 1, further comprising:
   detecting whether a previously identified prospective multi-tone signal which was determined not to have a machine generated multi-tone signal is substantially the same as a consecutively identified prospective multi-tone signal; and
   increasing the inequality threshold if the two consecutive prospective multi-tone signals are substantially the same.

8. The method of claim 1, further comprising:
   prior to comparing output profiles, accessing an input sample stream of a voice signal in a communications network; and
   processing the input sample stream to determine respective multi-tone frequencies of a prospective multi-tone signal.

9. The method of claim 8, wherein processing the input sample stream comprises computing a Fast Fourier Transform of the input sample stream.

10. The method of claim 9, wherein processing the input sample stream comprises applying the input sample stream to a set of bandpass filters tuned to prospective tone frequencies of the multi-tone signal.

11. The method of claim 8, further comprising comparing characteristics of the identified prospective multi-tone signal to preliminary thresholds.

12. The method of claim 11, wherein the preliminary thresholds relate to frequency deviation tolerances, level tolerances or twist tolerances of the prospective multi-tone signal.

13. The method of claim 12, comprising rejecting the identified prospective multi-tone signal in the event that its characteristics do not meet the preliminary thresholds.

14. The method of claim 13, further comprising setting each of the plurality of filters to one of the measured multi-tone frequencies of the identified prospective multi-tone signal.

15. An apparatus comprising:
   a profile comparator to:
      compare output profiles generated from sampled outputs of a plurality of filters having a single input sample stream applied to them and each filter being preset at a measured multi-tone frequency associated with an identified prospective multi-tone signal, and
      generate an inequality degree between the output profiles based on the comparison of the output profiles; and
   an inequality comparator to:
      compare the inequality degree with an equality threshold thereby to determine whether the input sample stream comprises a machine generated multi-tone signal; and
      determine that the input sample stream comprises a machine generated multi-tone signal when the inequality degree between the output profiles is lower than the inequality threshold.

16. The apparatus of claim 15, further comprising: the plurality of filters.

17. The apparatus of claim 16, further comprising a profile generator to generate the output profiles from sampled outputs of the plurality of filters.

18. The apparatus of claim 17, wherein the profile generator is configured to perform Goertzel algorithm functionality on a predetermined number of sampled outputs of the plurality of filters to obtain the output profiles.

19. The apparatus of claim 18, wherein each output profile is an output profile of the energy stored in each of the filters due to the applied input sample stream.

20. The apparatus of claim 15, wherein the multi-tone signal is a dual-tone multi-frequency signal.

21. The apparatus of claim 15, wherein the plurality of filters is two infinite impulse response (IIR) bandpass filters.

22. The apparatus of claim 15, wherein the profile comparator generates the inequality degree according to the Schwarz inequality.

23. The apparatus of claim 15, further comprising one or more processors to detect whether a previously identified prospective multi-tone signal which was determined not to have a machine generated multi-tone signal is substantially the same as a consecutively identified prospective multi-tone signal.

24. The apparatus of claim 23, wherein the one or more processors is to increase the inequality threshold if the two consecutive prospective multi-tone signals are substantially the same.

25. The apparatus of claim 15, further comprising a frequency identifier module to process the input sample stream to determine respective multi-tone frequencies of a prospective multi-tone signal.

26. The apparatus of claim 25, wherein the frequency identifier module computes a Fast Fourier Transform on the input sample stream to determine the respective multi-tone frequencies.

27. The apparatus of claim 26, wherein the frequency identifier module is a set of bandpass filters tuned to prospective tone frequencies of the multi-tone signal.

28. The apparatus of claim 27, further comprising a pre-processing module to compare characteristics of the identified prospective multi-tone signal to preliminary thresholds.

29. The apparatus of claim 28, wherein the characteristics relate to frequency deviation tolerances, level tolerances or twist tolerances of each of the prospective multi-tone signal.

30. An apparatus comprising:
  means for comparing output profiles generated from sampled outputs of a plurality of filters, the plurality of filters having a single input sample stream applied to them and each filter being preset at a measured multi-tone frequency associated with an identified prospective multi-tone signal;
  means for generating an inequality degree between the output profiles based on the comparison of the output profiles; and
  means for comparing the inequality degree with an inequality threshold to determine whether the input sample stream comprises a machine generated multi-tone signal, and to determine that the input sample stream comprises a machine generated multi-tone signal when the inequality degree between the output profiles is lower than the inequality threshold.

* * * * *